(12) United States Patent
Vasilenko

(10) Patent No.: US 7,682,641 B1
(45) Date of Patent: Mar. 23, 2010

(54) METHOD AND APPARATUS FOR PRESERVING PERISHABLE PRODUCTS

(75) Inventor: Vladimir Vasilenko, Maxville (CA)

(73) Assignee: 6231934 Canada Inc., Vaudreuil (CA)

( * ) Notice: Subject to any disclaimer, the term of this patent is extended or adjusted under 35 U.S.C. 154(b) by 1591 days.

(21) Appl. No.: 10/868,254

(22) Filed: Jun. 14, 2004

Related U.S. Application Data

(60) Provisional application No. 60/478,117, filed on Jun. 11, 2003.

(51) Int. Cl.
   *A23L 3/26* (2006.01)
(52) U.S. Cl. .................. 426/237; 426/521; 426/520; 426/246; 426/247; 426/248; 99/275
(58) Field of Classification Search ............ 426/521, 426/237, 238, 247, 248; 99/275
See application file for complete search history.

(56) References Cited

U.S. PATENT DOCUMENTS

| | | | | |
|---|---|---|---|---|
| 5,034,235 A | * | 7/1991 | Dunn et al. | 426/238 |
| 5,248,437 A | * | 9/1993 | Forrest | 210/695 |
| 5,744,094 A | * | 4/1998 | Castberg et al. | 422/24 |
| 5,900,211 A | * | 5/1999 | Dunn et al. | 422/24 |
| 6,010,727 A | | 1/2000 | Rosenthal | |
| 6,468,433 B1 | * | 10/2002 | Tribelski | 210/748 |
| 2002/0091294 A1 | * | 7/2002 | Dunn et al. | 588/227 |

FOREIGN PATENT DOCUMENTS

WO    WO 9927970 A2 *    6/1999

OTHER PUBLICATIONS

The Pasteurization Effect of Laser Infrared Irradiation on Beer MBAA TQ vol. 38, No. 4, 211-214 (2001) by Vladimir Vasilenko.

* cited by examiner

*Primary Examiner*—Drew E Becker
*Assistant Examiner*—Steven Leff
(74) *Attorney, Agent, or Firm*—Wilmer Cutler Pickering Hale and Door LLP

(57) ABSTRACT

The invention can be summarized as follows. There is provided a method for preserving the quality of a perishable product comprising the step of treating the product with one or more near-infrared lights, wherein preferably at least one near-infrared light is a near-infrared laser (or laser diode). The perishable product may be simultaneously treated with a magnetic field. The invention also pertains to an apparatus that may be used to preserve the quality of a perishable product.

21 Claims, 5 Drawing Sheets

Ga-As Laser- 880 nm light

METHOD AND APPARATUS FOR PRESERVING PERISHABLE PRODUCTS

CROSS-REFERENCE TO RELATED APPLICATION

The present application claims the benefit of the filing date of U.S. Provisional Patent Application No. 60/478,117 filed Jun. 11, 2003.

The present invention relates to a method and apparatus for preserving the quality of perishable products. More particularly, the present invention relates to a method and apparatus for preserving the quality of perishable products by exposing the products to near infrared light.

BACKGROUND OF THE INVENTION

There has been much interest in preserving the quality of food products such as fruits, vegetables, meats, dairy products, juices, beverages and the like during storage and shipping. Most of these processes have focused on reducing microorganism growth, for example by using a variety of techniques such as radiation processing, heat sterilization or pasteurization, chemical treatment, or cold storage.

Some types of produce are subjected to radiation such as gamma radiation or ultraviolet radiation to sanitize or sterilize food products. While these processes can destroy the growth of microorganisms in produce, drawbacks of using these types of radiation include breakdown or decomposition of the food products causing off tastes, and off odors. There is also a common public perception that produce treated by radiation may be unsafe for consumption. In addition, gamma radiation and to a lesser extent ultraviolet radiation can be hazardous to biological organisms including humans, and thus general public or household use of such types of radiation is either not possible or unadvisable.

Heat pasteurization and sterilization or has been used for a long time to reduce microorganism growth in many types of produce. Usually the produce is heat pasteurized to extend the shelf-life of the product prior to being sold to the consumer. Heat pasteurization of produce requires substantial energy in order to raise the temperature of the produce to a level suitable to kill microorganisms that can be responsible for the degradation of quality in foods. Further, many products such as fruits and vegetables cannot be treated by heat sterilization or pasteurization without severely affecting the quality of the produce.

Documents have been published regarding the processing of foods to extend shelf life. For example, U.S. Pat. No. 6,010,727 discloses a process for sanitizing fresh foods and beverage products using multiple stages of exposure to wavelengths of ultraviolet, near infrared and infrared light. A food or beverage product is exposed to ultraviolet light to kill microorganisms on the product. However, the UV light damages the organoleptic properties of the product. The damaged organoleptic properties are subsequently restored by exposure of the product to near infrared light. In addition the reference teaches that infrared light may be used to inactivate enzymes responsible for decomposition of the product. A drawback of this reference is that produce must be treated with a plurality of light sources in a complex method. In particular, the produce must be treated with ultraviolet light. In many cases, it is undesirable to treat fresh produce such as fruits and vegetables with ultraviolet light as such treatment can affect the quality of the produce.

The article "The Pasteurization Effect of Laser Infrared Irradiation on Beer" MBAA TQ Volume 38, Number 4, 211-214 (2001) by Vladimir Vasilenko discloses the use of low power, near infrared radiation for pasteurization of beer. However the results indicate that a substantial amount of bacteria remain viable after treatment and the author states that "further improvement is necessary".

One of the best known methods to extend the quality of produce is by refrigeration. It is well known that refrigeration reduces the metabolic activity of microorganisms and generally slows normal biological and biochemical processes. While it is well known in the art to store fresh produce and other products in refrigerators, most conventional refrigerators are only capable of extending the quality of produce by a short time. Thus, there is a need in the art to further preserve the quality of perishable products during storage or shipping at room temperature, and at reduced temperatures.

It is an object of the invention to overcome disadvantages of the prior art.

The above object is met by the combinations of features of the main claims, the sub-claims disclose further advantageous embodiments of the invention.

SUMMARY OF THE INVENTION

The present invention relates to a method and apparatus for preserving the quality of perishable products. More particularly, the present invention relates to a method and apparatus for preserving the quality of perishable products by exposing the products to near infrared light.

According to an embodiment of the present invention there is provided a method of preserving the quality of a perishable product comprising, treating the product with one or more near-infrared lights, wherein at least one near-infrared light is a near-infrared laser or near-infrared laser diode.

The step of preserving the quality may comprise inhibiting the growth of one or more microorganisms in the perishable product, for example, but not limited yeasts, bacteria, fungi, or a combination thereof. Examples of specific microorganisms may include, but are not limited to *E. coli*, for example, but not limited to strain O157:H7, *Listeria monocytogenes, Salmonella, Campylobacter, Leuconostoc oenes, Penicillum citrinum, Aspergillus niger, Rhizopus oryzhae, Cladosporium cladosporioides, Asaia bogornsis, Lactobacillus brevis, Pediococcus cerevisiae, Gluconobacter cerinus, Saccharomyces cerevisiae* or a combination thereof.

The perishable product may comprise dairy products, beer, juices, eggs, egg products, meats, produce such as but not limited to fruits and vegetables, cereal crops, crop products, spices, pet food, or a combination thereof.

The present invention also contemplates a method as defined above, wherein in a preferred embodiment, which is not meant to be limiting, the near infrared laser comprises a high power laser emitting light with a wavelength in the range of about 800 nm to about 1200 nm, preferably about 800 nm to 1100 nm, more preferably 804 nm to about 935 nm. It is preferred that the laser is a narrow band laser emitting light at about 870-890 nm.

The near infrared laser preferably emits light with a frequency about 5 Hz to about $1\times10^6$ Hz, employs a pulse duration (period) of about 10 nanoseconds to about 10 microseconds, and exhibits a power in the range of about 1 Watt to 10,000 Watts (10 KW) per a single pulse or 0.001 W to about 1000 W of the average radiation, preferably about 10 W to about 1,000 W per a single pulse or 0.1 W to about 100 W of the average radiation, more preferably about 20 W to about 100 W per a single pulse or about 0.5 W to about 10 W of the average radiation.

The perishable product may be treated with near-infrared laser light, from a laser or near infrared laser diode for between about 0.1 seconds and about 24 hours. The duration of treatment may depend on the physical properties of the product, for example, but not limited to whether the product is a liquid, solid or gaseous product, the volume of the product, the type and amount of microorganisms, for example, bacteria, viruses, fungi or combination thereof present in the product, whether the product is contaminated by microorganisms on the surface or throughout the product, the desired reduction coefficient, for example, but not limited to the percentage of microorganisms to be inhibited or destroyed in product, or combination thereof. Preferably about 100% (or about 5 to about 8 log reduction, or more) of the microorganisms are inhibited or destroyed.

The present invention also contemplates a method of preserving the quality of a perishable product comprising treating the product with a near infrared laser and/or one or more near infrared lights or light emitting diodes (LEDs).

Also provided by the present invention is a method of preserving the quality of a perishable product comprising, simultaneously treating the product with one or more near-infrared lights, wherein at least one near infrared light is a near infrared laser and;

subjecting the product to a magnetic field.

The magnetic field employed in the method as defined above is in the range of about 10 to about 500 mTesla, preferably the magnetic field employed in the method as defined above is in the range of about 40 to about 60 mTesla. However, the magnetic field may be outside the range if desired. The magnetic field may comprise any direction, for example, but not limited to substantially perpendicular or parallel to the emission of infrared laser light. In an alternate embodiment, the direction of the magnetic field may change with respect to the direction of the light emitted from the laser.

Also provided by the present invention is a method of preserving the quality of perishable products comprising treating the products with one or more non-laser near infrared lights and a magnetic field.

Also contemplated, the method as defined above may be part of one or more processes, for example, but not limited to pasteurisation process, microfiltering process, heat inactivation process, irradiation process, or a combination thereof. Further, the method may be practiced as part of a batch process or continuous flow process.

The present invention also provides an apparatus for preserving the quality of a perishable product comprising, a product container, and;

a near infrared laser.

The apparatus may further comprise one or more near infrared lights or light emitting diodes (LEDs), a magnetic field generator, or a combination thereof. In an embodiment of the present invention, which is not to be considered limiting in any manner, the apparatus may comprise a product container; a near-infrared laser; one or more non-laser near infrared lights or LEDs, and a magnetic field generator. In an alternate embodiment, the apparatus may comprise a product container, one or more non-laser near-infrared lights or light emitting diodes and a magnetic field generator.

The container may comprise an open container or a closed container. Also, the container may be refrigerated to further extend the quality of the product. In an embodiment of the present invention, wherein the product container is closed and the laser is located on the outside of the container, preferably the container walls are substantially transparent to near infrared light. For example, but not to be limiting, the walls of the container may comprise polyvinylchloride (PVC), glass, polypropylene, polycarbonate, Pyrex or other suitable material.

This summary of the invention does not necessarily describe all necessary features of the invention but that the invention may also reside in a sub-combination of the described features.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1A:
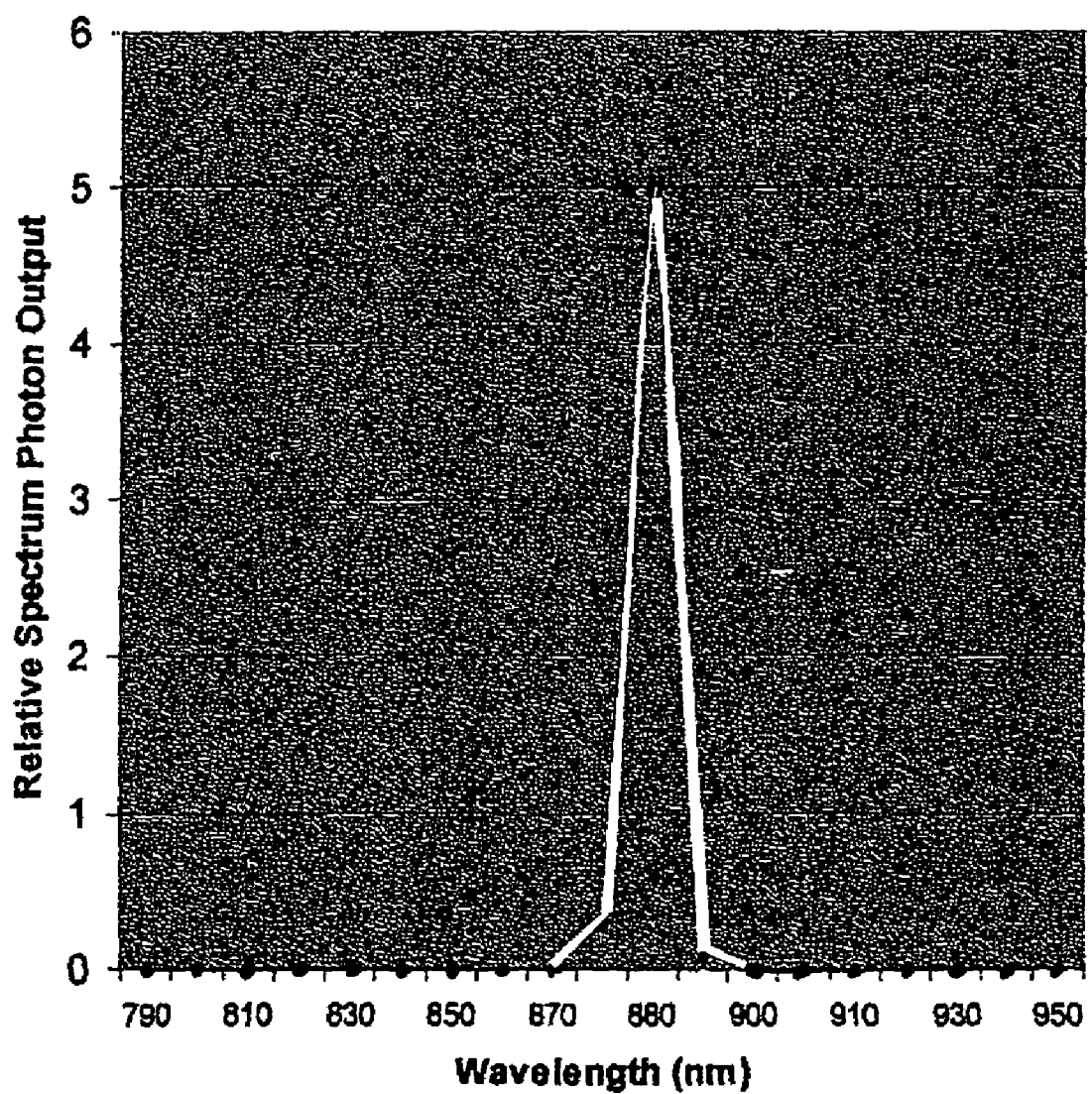
FIG. 1A shows a spectral profile of a semiconductor-type gallium arsenide infrared laser (Ga—As laser-880 light) that exhibits a peak emission at about 880 nm.

The present invention relates to a method and apparatus for preserving the quality of perishable products. More particularly, the present invention relates to a method and apparatus for preserving the quality of perishable products by exposing the products to near infrared light.

The following description is of a preferred embodiment by way of example only and without limitation to the combination of features necessary for carrying the invention into effect.

According to an embodiment of the present invention, there is provided a method for preserving the quality of perishable products comprising treating the products with one or more near-infrared lights, wherein at least one of the infrared lights is a near-infrared laser.

By the term "perishable product" it is meant any product that is capable of supporting the growth of microorganisms such as yeasts, bacteria, fungi and the like, and in which uncontrolled growth of microorganisms is associated with a decrease in quality of the product. The term may include food products such as, but not limited to solid, liquid or fluid food products, or a combination thereof. Perishable products that are typically subjected to pasteurisation, microfiltering, heat inactivation, irradiation, refrigeration or any combination thereof to inhibit or destroy microorganisms therein are particularly contemplated. Examples of such products include dairy products such as, but not limited to milk, cream, yoghurt, cheese, cottage cheese and the like; beer; juices of all types, including, but not limited to orange, apple, cranberry, grape, pineapple, grapefruit, tomato, or a combination thereof; eggs and egg products; meats including, but not limited to beef, ground beef, poultry, pork, and fish; fresh produce such as fruits and vegetables; cereal crops and crop products including, but not limited to barley, oat, wheat, corn and other grains; bean and other crops such as but not limited to soya; spices, flour, pet food, or a combination thereof. Further, the perishable product may be unprocessed meaning substantially as found in its natural state, partially processed, or fully processed for example, but not limited to, subjected to one or more food processing steps as would be known in the art.

By the term "preserving the quality" it is meant prolonging or extending the quality of the product over time as compared to a control product treated under similar conditions but without the method of the present invention. Without wishing to be bound by theory, the quality of a perishable product subjected to the method of the present invention may be preserved as a result of inhibiting or decreasing the growth of microorganisms in or on the product. In a preferred embodiment between about 80% to about 100% of microorganims are destroyed, more preferably between about 95% to 100%, still more preferably about 99% to about 100% are destroyed, still more preferably about 99.99% to about 100% are destroyed (about 4 to about 8 log reduction, or more). The quality of a perishable product may be assessed visually and scored based on an arbitrary scale. Alternatively, the perishable product may be assayed or tested for microbial content, for example, bacteria, yeast, and fungi, or a combination thereof. Further, specific types or strains of bacteria, yeast, fungi, for example, but not limited to *E. coli*, for example, but not limited to strain O157:H7, *Listeria monocytogenes, Salmonella, Campylobacter, Leuconostoc oenes, Penicillum citrinum, Aspergillus niger, Rhizopus oryzhae, Cladosporium cladosporioides, Asaia bogornsis, Lactobacillus brevis, Pediococcus cerevisiae, Gluconobacter cerinus, Saccharomyces cerevisiae* or a combination thereof may be tested for their presence and amount in the perishable product. A variety of tests for specific bacteria, yeast and fungi are known in the art and may be practised by a person of skill in the art.

In an alternate embodiment, a perishable product may be assayed or tested for one or more decomposition products, for example, but not limited to one or more molecules associated with off-flavors or spoilage products, for example, but not limited to specific aldehydes, acids, ketones and the like. The perishable product may also be tested for one or more products of microbial metabolism. The perishable product may be tested using a variety of methods known in the art and any one or all of such methods are fully contemplated by the method of the present invention. For example, but not to be considered limiting in any manner, a test of a perishable product or a sample thereof may comprise one or more of chromatographic separations, for example, performed by gas chromatography, liquid chromatography, high performance liquid chromatography, including, but not limited to reverse phase, gel filtration, ion exchange, hydrophobic interaction, hydroxyapetite or a combination thereof. The tests may further comprise absorption spectroscopy, mass spectrometry, electrophoresis, nuclear magnetic resonance (NMR), immunodetection, for example, but not limited to enzyme linked immunosorbant assays (ELISAs) and sandwich ELISAs, or any combination thereof.

The near-infrared laser employed in the method of the present invention emits light in the range of about 800 nm to about 1200 nm, preferably about 800 nm to 1100 nm, more preferably about 804 nm to about 935 nm. It is preferred that the laser is a narrow band laser emitting light at about 870-890 nm.

The laser preferably emits pulse frequency in the range of about 5 Hz to about $1 \times 10^6$ Hz. Any subset range within the wider range defined above is also contemplated, for example, but not limited to from about 5 Hz to about 5000 Hz, about 5 Hz to about 25000 Hz (25 KHz), about 5 Hz to about 100 KHz, about 50 Hz to about 5000 Hz, about 50 Hz to about 25 KHz, about 50 Hz to about 100 KHz, about 50 Hz to about $1 \times 10^6$ Hz or any value therein between, for example, but not limited to 1 KHz, 5 KHz, 25 KHz, 100 KHz and the like. In a preferred embodiment, which is not meant to be limiting in any manner, the laser is preferably a high frequency laser having a frequency greater than 5000 Hz, preferably greater than about 10 KHz, more preferably greater than about 25 KHz, still more preferably greater than about 50 KHz and still more preferably greater than about 100 KHz.

The power of each pulse may be in the range of about 0.001 W to about 10 KW, preferably about 0.01 W to about 1000 W, more preferably about 100 W. In an embodiment wherein the product is treated with a frequency of about 5000 Hz, the average power of the laser is about 2 mW. Preferably, the average power of the laser is greater than 0.002 W, more preferably greater than about 0.010 W, more preferably greater than about 0.1 W. Preferably the power of the laser beam that interacts with the perishable product is in the range of about 0.010 Watts/ml to about 10 Watts/ml, preferably about 1 Watt/ml. It is possible that power values of Watts/ml outside the range, particularly higher power/ml values may also be employed if desired.

The period or duration of each impulse is preferably in the range of between about 10 nanoseconds to about 10 microseconds. However, pulse durations outside the range are also contemplated by the present invention.

It is also contemplated that multiple lasers with different wavelengths, different frequencies, different powers, or a combination thereof be employed to treat perishable products and the like.

The perishable product is treated with near-infrared laser light for a period between about 0.1 seconds to about 24 hours, preferably about 1 minute to about 20 minutes. The duration of the treatment period may be product dependent as will be evident to someone of skill in the art. For example, the duration of the treatment period may be dependent on whether the product is a liquid, solid or gaseous product, the volume of the product, the type and amount of microorganisms, for example, bacteria, viruses, fungi or combination thereof present in the product, whether the product is contaminated by microorganisms on the surface or throughout the product, the desired reduction coefficient, for example, but not limited to the percentage of microorganisms to be inhibited or destroyed in the product, or a combination thereof. Preferably about 100% of the microorganisms are destroyed (about 5 to about 8 log reduction, or more). Without wishing to be limiting, solid or substantially solid products such as cereal products, grains and the like may require a different treatment period than liquids such as milk, juices and the like. Similarly, large volumes of perishable product may require a different treatment period from small volumes of perishable product.

Preferably, substantially all of the perishable product is irradiated with near-infrared laser light. This may be accomplished for example in a continuous flow system or the like wherein perishable product flows or is transported through a zone comprising near-infrared laser light. Alternatively, perishable product contained in a batch system may be mixed during irradiation with near-infrared laser light in order to treat substantially all the perishable product. In an alternate embodiment of the present invention, the perishable product may be placed on, or in a platform, container or the like that may be moved through a plurality of positions exposing perishable product to near-infrared laser light. Such a system may be beneficial when the near-infrared laser beam is relatively narrow compared to the physical dimensions of the perishable product. In still a further embodiment, the near infrared laser may be scanned over, around or both over and around the perishable product. For example, but without wishing to be limiting in any manner, the near infrared laser may be attached to a robot that moves through a plurality of positions ensuring that substantially all of the perishable product is exposed to the near-infrared laser light.

Any suitable near infrared laser known in the art may be employed in the method of the present invention. Without wishing to be considered limiting, the laser may comprise a material made from gallium-arsenide (Ga—As) having a peak emission at about 880 nm and a maximal bandwidth of about 10 nm, for example as shown by the spectral profile of FIG. 1A. Specific examples of near-infrared lasers that may be employed in the method of the present invention include, but are not limited to a pulsed laser diode emitting in the range of from about 850 nm to about 980 nm available from Lasermate Group, Inc., a high brightness laser diode with a peak wavelength of about 808±5 nm and maximum power of 4000 mW available from Boston Laser Inc., or a high brightness laser diode with peak wavelength of about 915±10 nm, available from Boston Laser Inc. Other manufacturers of suitable semiconductor lasers include, but are not limited to Epitex Inc., Hamamatsu Inc., and Sony Inc, for example, but not limited to the SLD432S 40 W Array Laser Diode.

Figure 1B:
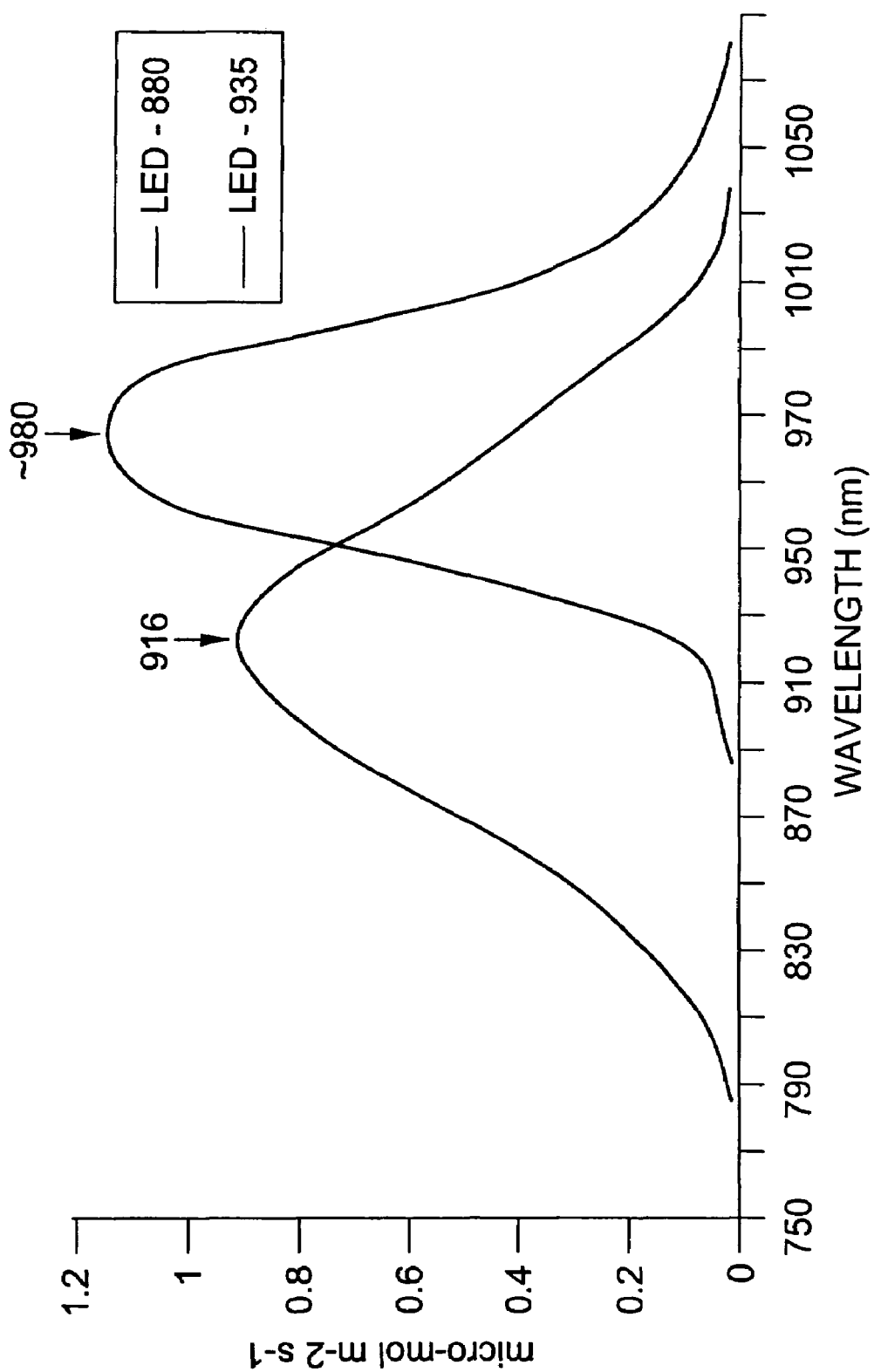
FIG. 1B shows spectral profiles for two other infrared LEDs (aluminum-gallium arsenide LED-880 and LED 935).

The method of the present invention may also comprise one or more non-laser, near-infrared lights or near infrared light emitting diodes (LEDs) that emit light in the range of between about 800 nm to about 1200 nm, preferably about 800 nm to 1100 nm, more preferably about 805 nm to about 900 nm, more preferably still about 890 nm. A near infrared light or LED may comprise a material such as, but not limited to gallium-arsenide (Ga—As) or aluminum-gallium-arsenide (Al—Ga—As). In an embodiment, the present invention may comprise an infrared-880 nm LED having a maximum peak emission at about 916 nm with an average spectral bandwidth of about 90 to about 100 nm at half maximum output. Preferably the power level of the non-laser LED radiation employed in the method of the present invention is in the range of about 60 to about 100 mW. Specific examples of non-laser near infrared lights or LEDs that may be employed in the method of the present invention include, but are not limited the infrared-935 nm light emitting diodes (LED) available from Honeywell (#840-3445-004). Alternately, the near infrared light may be produced from an aluminum-gallium-arsenide (AlGaAs) source, for example, but not limited to an aluminum-gallium-arsenide LED available from Honeywell (#840-3470-001) with an average peak wavelength of about 916 nm and a spectral bandwidth at half maximum output of about 94 nm. FIG. 1B shows the spectral profile of other non-laser infrared lights that may be employed by the present invention.

It is also contemplated that non-laser near-infrared light may be provided by a continuous wave or pulsed light system, or combination thereof. Without wishing to be limiting, an example of a pulsed light system is the SteriPulse™ type C Xenon flashlamp system available from XENON Corporation. A continuous wave or pulsed light system may produce light over a range of wavelengths, for example, but not limited to about 250 nm to about 1200 nm, but it is preferred that light of substantial relative irradiance is produced over the range of about 250 to 400 nm and about 800 to about 1200 nm (for example, two or more peaks of irradiance), preferably about 250-300 nm and about 800 to about 1100 nm, more preferably at about 250 nm and about 890 nm (two single peaks). By the term "substantial relative irradiance" it is meant a relative irradiance greater than about 0.02, preferably greater than about 0.05, more preferably greater than about 0.1 and still more preferably greater than about 0.2 at one or more wavelengths within the 250 nm to 1100 nm range, preferably the 250 to about 300 nm range and the 805 nm to about 935 nm range, still more preferably two single peaks at about 250 nm and about 890 nm obtained from the spectral curve for the lamp or flashlamp plotted as relative irradiance versus wavelength, and wherein the peak irradiance observed is set to a value of 0.5.

The perishable product may be treated with non-laser, near-infrared light for any suitable time period. The perishable product may be treated with non-laser, near-infrared light for the same duration period as that used for near infrared laser light, or the duration may be different. In an embodiment of the present invention, perishable product is preferably treated with non-laser infrared light for a time period between about 1 second and about 24 hours, preferably about 10 seconds to about 1 minute. The time period may be reduced by increasing the intensity of light interacting with the perishable product. Time values outside this range may also be employed if desired.

Preferably, the intensity of the non-laser, near infrared light is in the range of about 10 to 1000 µmol m$^{-2}$ s$^{-1}$, preferably about 200 to about 500 µmol m$^{-2}$ s$^{-1}$.

In an embodiment of the present invention, the method may further comprise subjecting the perishable product to a magnetic field. Preferably the product is simultaneously subjected to a magnetic field and treated with near infrared laser light, near-infrared light, or a combination thereof. In a preferred embodiment the magnetic field is in the range of about 10 to about 500 mTesla. However, magnetic fields of different strengths outside this range may also be employed.

The magnetic field may be oriented in any direction as compared to the propagation of light from the laser. In an embodiment, the direction of the magnetic field is substantially parallel to the direction of near infrared light emitted by the laser. In an alternate embodiment, the direction of the magnetic field may be substantially perpendicular to the direction of near infrared light emitted by the laser.

Without wishing to be bound by theory, a magnetic field may enhance near infrared light treatment of the perishable product by providing an electromagnetic induction in the biopolymer structure of membrane and cytoplasmic proteins and by providing additional polarization, dissociation of electrolytes and electric current in the protoplasm of microorganisms. Electromagnetic induction and subsequent near infrared irradiation, or concomitant electromagnetic induction and near infrared irradiation may inhibit or kill more microorganisms in or on the perishable product than does near infrared irradiation alone.

In an alternate embodiment of the present invention, there is provided a method for preserving the quality of perishable products comprising treating the products with one or more non-laser near infrared lights and a magnetic field. The method may be performed as indicated previously with the exception that the products are not treated with near infrared laser light.

The method of the present invention may be employed alone or it may be practiced as part of a batch process, a continuous flow process, or a combination thereof. Further the method of the present invention may be employed in combination with existing processes known in the art for perishable products, such as, but not limited to pasteurisation processes, microfiltering processes, heat inactivation processes, irradiation processes, for example, but not limited to UV, gamma, and electron beam irradiation processes, or any combination thereof. In addition the method of the present invention may be employed as part of a canning or other food packaging process. Preferably the products are treated prior to being canned. In these regards, the method of the present invention may reduce or eliminate the need for additional, more costly processes such as pasteurisation, microfiltering, heat inactivation or other irradiation process. For example, but not wishing to be limiting, the method of the present invention may decrease the temperature, time or both required to heat sterilize a product thereby providing a substantial cost benefit.

Also according to the present invention there is provided an apparatus for treating a perishable product with near infrared light, the apparatus comprising one or more infrared lights, wherein at least one of the infrared lights is a near-infrared laser. As indicated above, the apparatus may further comprise one or more near infrared lights or LEDs or other suitable light systems. In an alternate embodiment the apparatus may further comprise a magnetic field generator. Any magnetic field generator known in the art may be employed in the apparatus. In still an alternate embodiment, there is provided an apparatus for treating a perishable product with near infrared light, the apparatus comprising one or more non-laser near infrared lights or LEDs and a magnetic field generator.

The apparatus may also comprise a product container, receptacle, or vessel that is capable of being used to hold, store or transport the perishable product. The product container may comprise an open container, for example, but not limited to any suitable container that does not comprise a top, lid or the like. In such an embodiment the product stored in the product container may be exposed to the environment outside the container. Alternatively, the product container may be a closable container meaning that the stored product is not exposed directly to the environment on the outside of the container during storage.

The product container as described herein may be refrigerated or comprise a refrigeration system to further preserve the quality of products during storage, transport, shipping or the like. In an embodiment wherein the product container of the present invention is refrigerated, preferably, the produce container is refrigerated to a temperature between about 0° C. and about 15° C., preferably about 3° C. to 6° C. Various refrigeration systems are known in the art and any of such systems is contemplated by the product container of the present invention.

Also contemplated, the method as defined above may form part of one or more processes, for example, but not limited to pasteurisation process, microfiltering process, heat inactivation process, irradiation process such as, but not limited to X-ray irradiation, gamma irradiation, UV irradiation or a combination thereof. Further, the method may be practiced as part of a batch process or continuous flow process.

Figure 2:
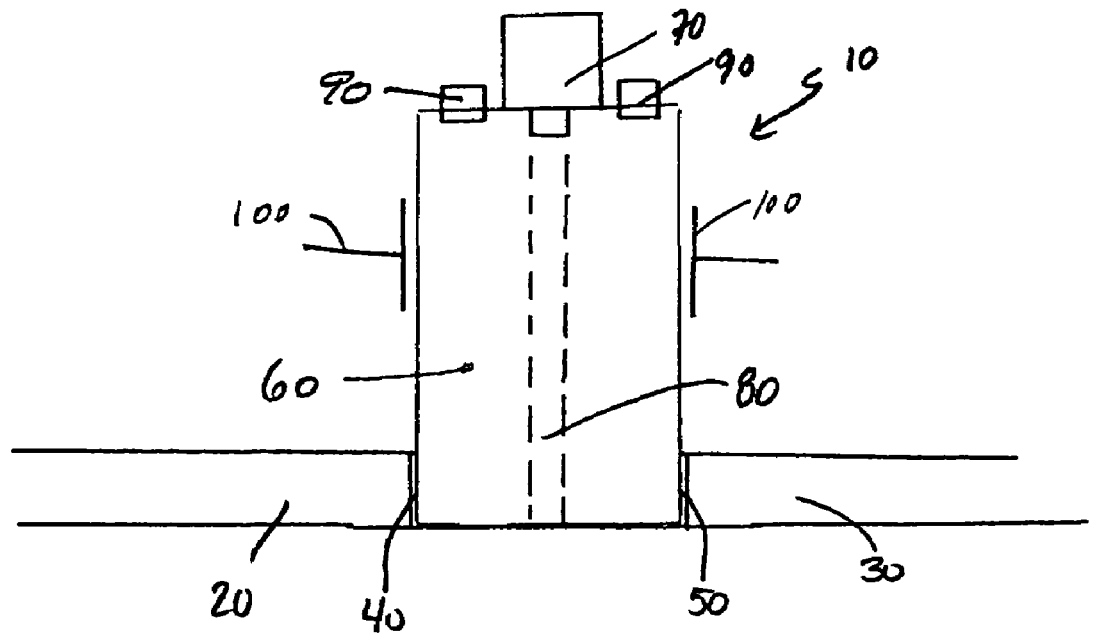
FIG. 2 shows a representative side view profile of a product container comprising a near infrared laser, one or more non-laser near infrared lights or LEDs and magnetic field source generator.

In an embodiment of the present invention, the near-infrared laser may be integrated into a vessel or container, or form part of a vessel or container. In addition one or more near-infrared lights, LEDs, magnetic field generator or a combination thereof may also be external to or integrated into a vessel or container. For example, as shown in the following figures which are meant to be exemplary and non-limiting in any manner, there is shown in FIG. 2 a cross-sectional view of a product container (10) comprising inlet (20) and outlet (30) controlled by inlet valve (40) and outlet valve (50), respectively. Perishable product (60) may be delivered, pumped or the like into the product container (10) through inlet (20). Also shown in FIG. 2 is near infrared laser (70) emitting near infrared beam (80) for treating perishable product (60), near infrared diodes (90) for treating the perishable product with non-laser near infrared light, and magnetic field generator (100) for generating a magnetic field within the container. The product container may optionally comprise a mixing system, agitator, stirring system or the like for mixing perishable product in the container. A mixing system, or the like may be employed to ensure a greater portion of the perishable product interacts with near infrared laser light, near infrared light, magnetic field, or a combination thereof.

Figure 3:
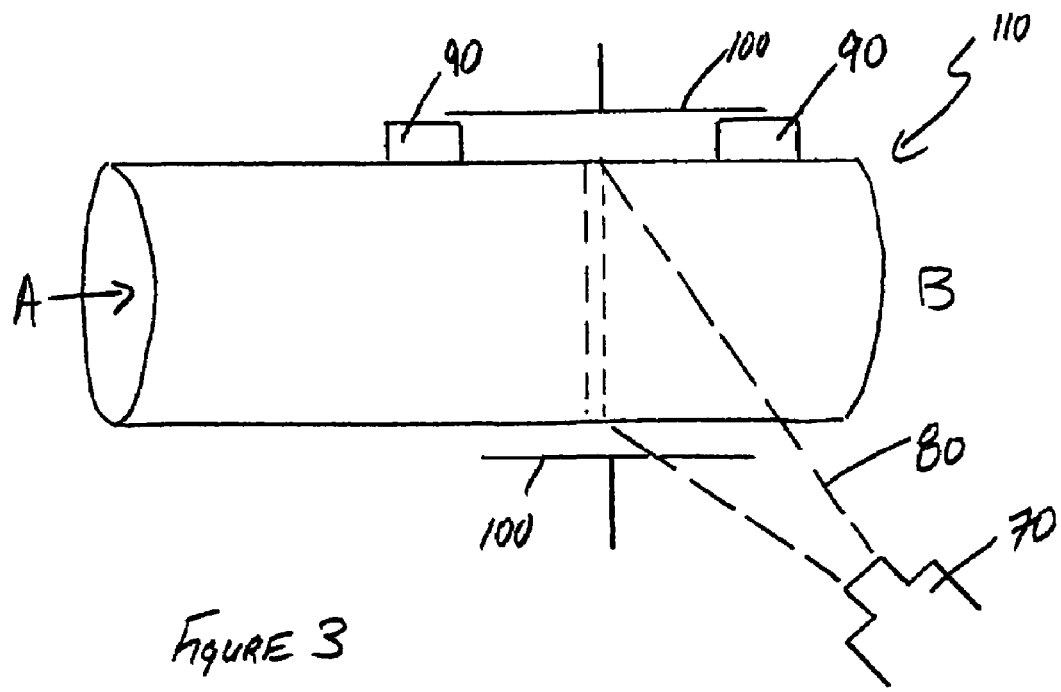
FIG. 3 shows a representative side view profile of a cylindrical product container comprising an externally located near infrared laser, one or more non-laser near infrared lights or LEDs and magnetic field source generator.

Referring now to FIG. 3 there is shown a side view of a cylindrical product container (110), for example a pipe or the like comprising perishable product flowing from region A to region B. A near infrared laser (70) is mounted external to the cylindrical product container and emits a near infrared beam (80) that penetrates the container. Also shown is magnetic field generator (100) for generation of a magnetic field and non-laser, near infrared LEDs (90). Perishable products flowing or being transmitted from region A to region B pass through space comprising near infrared laser beam, a magnetic field and non-laser near infrared light. Preferably the space comprises the laser beam, near infrared light and magnetic field.

Figure 4:
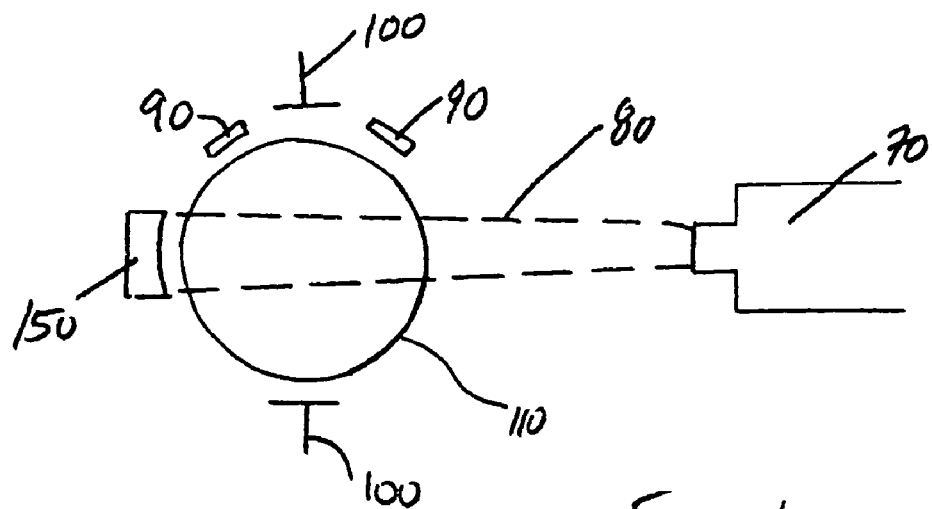
FIG. 4 shows a representative cross-sectional view of a cylindrical product container comprising an externally located near infrared laser, one or more non-laser near infrared lights or LEDs and magnetic field source generator.

Referring now to FIG. 4, there is shown a cross-sectional view of a cylindrical product container (110) comprising perishable product (not shown) that flows therethrough. A near infrared laser (70) is external to container (110) and directs a beam (80) transverse to the container. The beam (80) passes through container (110) and may impinge a detector (150) or the like on the opposite side of the container. A magnetic field generator (100) is also shown which creates a magnetic field through the cylindrical product container (110). Further shown is non laser near infrared lights (90). Preferably, the near infrared laser beam, magnetic field, and non-laser near infrared light pass through at least some of the same space.

Perishable product flowing through the container interacts with light from the near infrared laser, near infrared LEDs and magnetic field to preserve the quality of the product. Preservation of the product may be achieved for example, but not limited to by inhibiting the growth of microorganisms contained in or on the perishable product. In effect, such a system may be employed to sterilize, sanitize, or cold pasteurise food products and the like for example, but not limited to prior to packaging, canning or the like.

Figure 5A:
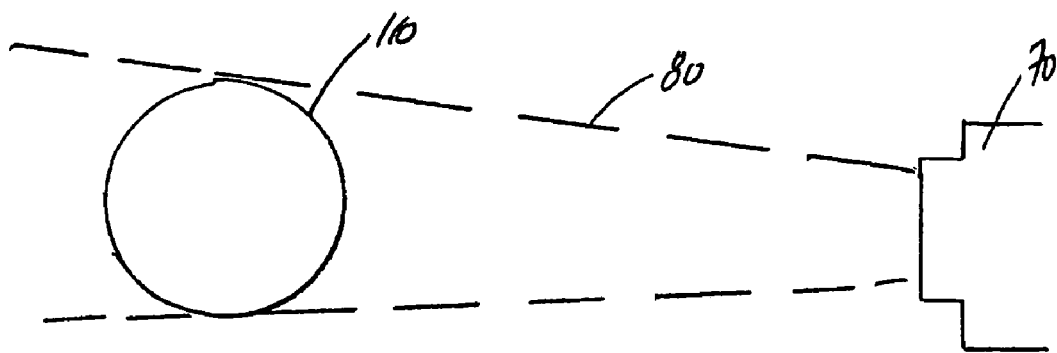
FIG. 5A shows a representative cross-sectional view of a cylindrical product container wherein the near infrared laser is external to the container and the beam width of the laser is greater than the diameter of the container.
Figure 5B:
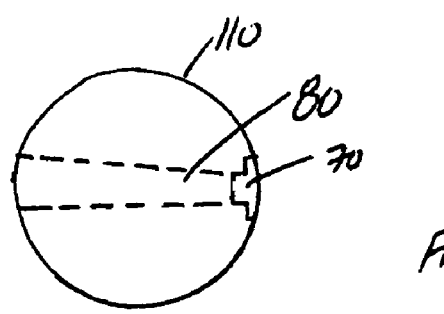
FIG. 5B shows a representative cross-sectional view of a cylindrical product container wherein the laser is integrated into the container.

Referring now to FIG. 5A, there is shown an embodiment wherein the near infrared laser (70) emits a beam (80) that is greater than the diameter of the product container (110). Referring now to FIG. 5B, there is shown an embodiment wherein the near infrared laser is integrated into the container. In the embodiment shown the laser produces a beam in a plane that transects the long axis of the container. It is also contemplated that the embodiments shown in FIGS. 5A and 5B may additionally comprise a magnetic field generator, one or more non-laser infrared lights or LEDs, or a combination thereof. Further they may be external to the container, internal to the container, integrated into the container, or any combination thereof.

Figure 6:
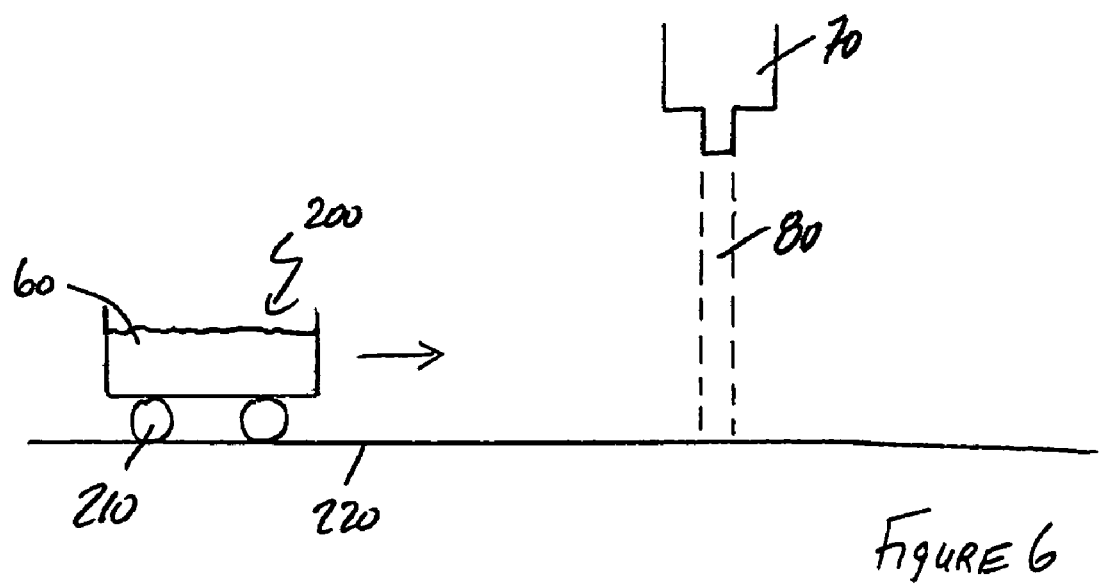
FIG. 6 shows a representative side view of a product container comprising wheels that may be directed on a track to pass under a near infrared laser.

Referring now to FIG. 6, there is shown a product container (200) comprising perishable product (60). The container (200) comprises wheels (210) and may be directed on track (220) to pass under a near infrared laser (70) emitting a near infrared beam (80). The laser beam (80) interacts with perishable product in the container to inhibit or destroy microorganisms in or on the perishable product. The product container and perishable product therein may also interact with a magnetic field (not shown), one or more non laser infrared LEDs (not shown), or a combination thereof. In alternate embodiments, product containers may be transported on pallets, rollers, rails, conveyor belts, tracks and the like tracks through a beam emitted by a near infrared laser.

In embodiments wherein the near infrared laser is located external to a container, preferably the container is made of a material substantially transparent to near infrared radiation, for example, but not limited to polyvinylchloride (PVC), glass, polypropylene, polycarbonate, Pyrex® and the like. It is also contemplated that a portion of a container, pipe, tube or the like which comprises perishable product may comprise a reflective material, thereby providing a reflective surface to reflect near infra-red and optionally other wavelength ranges of light. For example, near infrared light that passes through the proximal side of a container may be reflected by a reflective surface on the distal side of the container.

In an embodiment, which is not meant to be limiting in any manner, the present invention provides a method and apparatus to preserve the quality of milk or beer. The milk or beer is treated with near infrared laser light, as it passes through clear PVC tubes prior to being bottled. Alternatively, the milk or beer may be treated with near infrared light after it is bottled. In such an embodiment it is generally preferred that the bottled milk or beer is treated with infrared light before the bottles are labelled.

High frequency near infrared laser light produces little heat within food and does not cook foods. Further, it does not promote molecular ionization and thus does not promote the same damage to foodstuffs as do other forms of radiation processing such as UV processing and gamma irradiation. Further, the present invention may consume less energy than conventional heat inactivation or pasteurization processes as the method for the present invention does not require heating products to the same high temperatures as that of conventional heat inactivation or pasteurization processes.

In an alternate embodiment the method of the present invention may be employed to treat wastewater. In still a further embodiment, the present invention provides an apparatus for treating wastewater. Wastewater may be from any process known in the art wherein microorganisms are present. In an embodiment, the method, apparatus or both may be employed to make a food production process more environmentally friendly and ecologically safe, for example, but not limited to by treating wastewater that is produced from the process before it is discharged into the environment.

The above description is not intended to limit the claimed invention in any manner, furthermore, the discussed combination of features might not be absolutely necessary for the inventive solution.

The present invention will be further illustrated in the following examples. However it is to be understood that these examples are for illustrative purposes only, and should not be used to limit the scope of the present invention in any manner.

EXAMPLES

Example 1

Visual Scoring of Produce

Visual Assessment of Products
Perishable products such as fruits and vegetables are visually assessed on the second day and every other day thereafter for a period of up to 22 days according to the following scale:

Score 8-10: High quality. Product exhibits no signs of deterioration and is suitable for consumption.

Score 6-7: Modest quality. Product exhibits some signs of deterioration but is suitable for consumption.

Score 4-5: Low quality. Product exhibits lack of freshness. Skins may be shriveled or brown spots may be apparent.

Score 1-3: Poor quality. Product cannot be consumed. Rotted spots may be present. Bad smell may be present.

The higher the quality assessment score, the better the quality of the product. At the time of each assessment, pictures are taken to visually verify the collected data.

Example 2

Preservation of Beer

Non-pasteurized beer (Kazbegi) is employed in this particular example.

Unlabeled bottles of beer pass single file on a conveyor system past a near infrared laser. The laser light comprises a peak emission wavelength of 880±5 nm and is set on maximum power of 4000 mW. The pulse frequency is about 5000 Hz and the period or duration of each impulse is about 100 nanoseconds. The bottles interact with the laser for about 20 seconds.

A magnetic field generator is employed at right angles to the laser to produce a magnetic field of about 60 milliTesla. Further, two 935 nm light emitting diodes (LED) available from Honeywell (#840-3445-004) are employed on each side of the laser to illuminate the bottles with near infrared light. These LEDs exhibit peak emission at about 958 nm with an average spectral bandwidth of about 50 nm.

As controls, a first set of bottles is processed in exactly the same manner except for not being irradiated with laser light. A second set of bottles is not subjected to any processing conditions.

Beer treated with near infrared laser light, non-laser infrared light and magnetic field is sampled and the number of bacteria, and yeast are compared to control beer treated with non-laser infrared light and magnetic field and control beer bottles that are untreated.

Example 3

Preservation of Nonpasteurized Milk

Non-pasteurized whole milk is employed in this specific example.

The processing of milk was performed exactly as indicated in Example 2, except that the milk is flowing under pressure through a PVC pipe. Milk is sampled prior to processing and after processing via sample collection ports in the PVC tubing.

Milk treated with near infrared laser light, non-laser infrared light and magnetic field is sampled and the number of bacteria is compared to control milk treated with non-laser infrared light and magnetic field and control milk that is untreated.

Example 4

Effect of Laser Near Infrared Radiation on Bacteria

Petri dishes comprising individually growing microorganisms *Penicillium citrinum, Leuconostoc oenes, Asaia borgornis, E. coli* O157:H7, *Listeria monocytogenes, Pediococcus cerevisiae, Cladosporium cladosporioides, Rhizopus oryzhae, Aspergisis niger, lactobacillus brevis* and *Saccharomyces cerevisiae* were subjected to low power infrared laser light (890 nm) using a Milta Laser system exhibiting single pulse power of up to 5 watts/cm² (2 milliwatts on average), pulse frequency of 5000 Hz, and a pulse duration of 90-120 nseconds. The petri dishes were maintained about 10 cm from the laser source. The petri dish was exposed for a total duration of 5 minutes. However, as the laser beam was smaller in area than the petri dish, the petri dish was moved manually during the 5 minute exposure. It is estimated that each square unit of petri dish area received a total of about one minute near infrared laser light exposure. Samples were taken from the petri dishes prior to and after treatment with the near infrared laser. The percent of organisms killed by the laser radiation are shown in Table 1.

TABLE 1

Effects of low power near infra-red laser light on microorganism growth and viability

| Organism | Percent of organisms killed |
| --- | --- |
| *Penicillium citrinum* | 99.7% |
| *Leuconostoc oenes* | 99.3% |
| *Asaia borgornis* | 99.1% |
| *E. coli* O157:H7 | 99.0% |
| *Listeria monocytogenes* | 98.3% |
| *Pediococcus cerevisiae* | 97.3% |
| *Cladosporium cladosporioides* | 96.5% |
| *Rhizopus oryzhae* | 94.5% |
| *Aspergisis niger* | 93.3% |
| *lactobacillus brevis* | 91% |
| *Saccharomyces cerevisiae* | 61.5% |

The percent of organisms killed may be increased by employing a near infrared laser with a higher frequency, power, or combination thereof. Further, a higher kill percentage may be obtained by increasing the duration of exposure and/or reducing the distance of the laser source to the petri dish thereby reducing the effect beam spreading. Also, a higher kill percentage may be obtained by simultaneously treating the microorganism with one or more non-laser near infra red lights, for example, but not limited to a pulsed lighting system, such as those available from Xenon Corporation. Microorganisms other than those listed above may also be effectively killed.

All citations are herein incorporated by reference.

The present invention has been described with regard to preferred embodiments. However, it will be obvious to persons skilled in the art that a number of variations and modifications can be made without departing from the scope of the invention as described herein.

The embodiments of the invention in which an exclusive property of privilege is claimed are defined as follows:

1. A method of preserving the quality of a perishable product comprising, treating the product with a near-infrared laser and one or more non-laser, near infrared lights, wherein the intensity of each non-laser, near infrared light is in the range of about 10 to 1000 μmol m⁻² s⁻¹.

2. The method of claim 1, wherein said preserving the quality comprises inhibiting the growth of one or more microorganisms in said perishable product.

3. The method of claim 2, wherein said one or more microorganisms are selected from the group consisting of yeasts, bacteria, fungi, or a combination thereof.

4. The method of claim 3, wherein said microorganisms comprise *E. coli, Listeria monocytogenes, Salmonella, Campylobacter, Leuconostoc oenes, Penicillum citrinum, Aspergillus niger, Rhizopus oryzhae, Cladosporium cladosporioides, Asaia bogornsis, Lactobacillus brevis, Pediococcus cerevisiae, Gluconobacter cerinus, Saccharomyces cerevisiae* or a combination thereof.

5. The method of claim 1, wherein said perishable product comprises dairy products, beer, juices, eggs, egg products, meats, produce, cereal crops, crop products, spices, pet food, or a combination thereof.

6. The method of claim 1 wherein said near infrared laser emits light with a wavelength in the range of about 800 nm to about 1200 nm.

7. The method of claim 1 wherein said near infrared laser emits light with a frequency of about 5 Hz to about 1×10⁶ Hz.

8. The method of claim 7, wherein said frequency is in the range of greater than 5 KHz to about 100 KHz.

9. The method of claim 1, wherein said near infrared laser emits light with a period of about 10 nanoseconds to about 10 microseconds.

10. The method of claim 1, wherein said near infrared laser emits light with a power in the range of about 1 W to about 100 W per a single pulse.

11. The method of claim 1, wherein said perishable product is treated with near infrared laser light for between about 0.1 seconds and about 24 hours.

12. The method of claim 1, wherein said laser comprises a material made from gallium-arsenide (Ga—As).

13. The method of claim 1, said method comprising part of one or more processes selected from the group consisting of pasteurisation process, microfiltering process, heat inactivation process, irradiation process, or a combination thereof.

14. The method of claim 1, said method comprising part of a batch process or continuous flow process.

15. The method of claim 1 wherein said method destroys between about 80% to about 100% of microorganisms in said perishable product.

16. The method of claim 15, wherein said method destroys between about 95% to about 100% of microorganisms in said perishable product.

17. The method of claim 15, wherein said method destroys between about 99% to about 100% of microorganisms in said perishable product.

18. The method of claim 15, wherein said method provides between about a 5 log and an 8 log reduction, or more of microorganisms in said perishable product.

19. A method of preserving the quality of a perishable product comprising treating the product with a near infrared laser and one or more non-laser near infrared lights or light emitting diodes (LEDs), wherein the intensity of each non-laser, near infrared light or LED is in the range of about 10 to 1000 μmol m⁻²s⁻¹.

20. A method of preserving the quality of a perishable product comprising,
    simultaneously treating the product with a near infrared laser and one or more non-laser near infrared lights, wherein the intensity of each non-laser near infrared light is in the range of about 10 to 1000 μmol m⁻²s⁻¹ and;
    subjecting said product to a magnetic field.

21. The method of claim 20, wherein said magnetic field is in the range of about 10 to about 500 mTesla.

* * * * *